J. Holmes,
Ash Sieve.
Nº 34,499.      Patented Feb. 25, 1862.

Witnesses;
O. F. D. Hale Jr.
J. R. Bampton

Inventor
John Holmes

UNITED STATES PATENT OFFICE.

JOHN HOLMES, OF BOSTON, MASSACHUSETTS.

IMPROVEMENT IN COAL-SIFTERS.

Specification forming part of Letters Patent No. 34,499, dated February 25, 1862.

*To all whom it may concern:*

Be it known that I, JOHN HOLMES, a citizen of the United States of America, and a resident of Boston, in the county of Suffolk and State of Massachusetts, have invented a new and useful Sifter for Screening or Sifting Coal-Ashes or Various Other Matters; and I do hereby declare the same to be fully described in the following specification, and represented in the accompanying drawings, of which—

Figure 2:
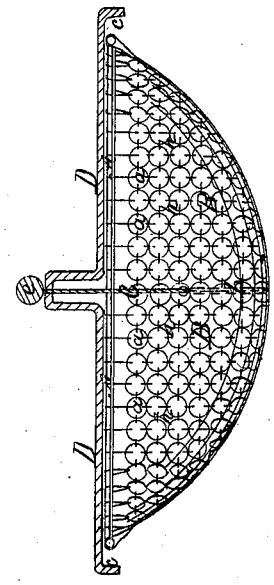
Figure 3:
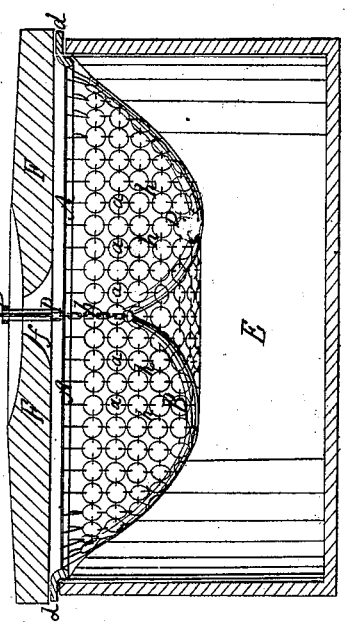
Figure 1:
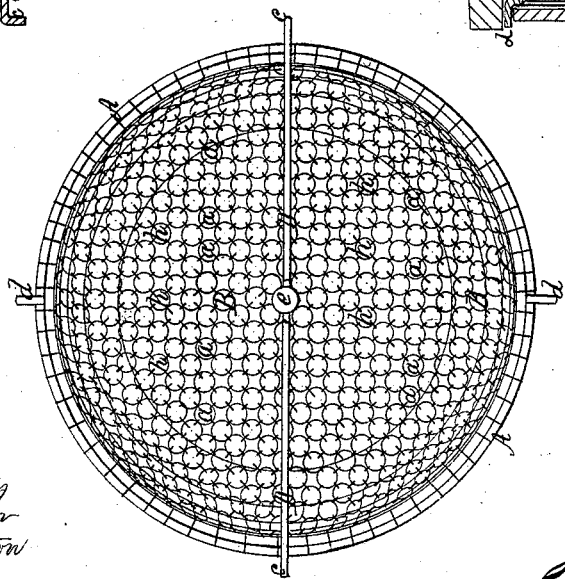

Figure 1 is a top view, and Fig. 2 is a vertical and central section, of it as it appears preparatory to being applied to its box or case. Fig. 3 is a section of it and its case as arranged together.

The principal parts of the said sifter consist of a supporting ring or annulus A, a flexile bag or sieve B, and a lifter C, or mechanism for alternately raising and lowering the lower part of the flexile sieve. The sieve B is a shallow bag formed with meshes. It is exhibited in the drawings as composed of a series of small metallic rings $a\ a\ a$, each one of which is connected to each of those next contiguous to it by a small link or helix of wire $h$, the whole constituting, when put together, a metallic net or flexible bag, which at its edges is suspended from a ring or annulus A or its mechanical equivalent. At the center of the lower part of the flexile sieve the lifter C is attached by means of a short chain $b$ or in any other proper manner, the said lifter being a rod passing up through a bar D or its equivalent, which extends across the ring A and projects in opposite directions therefrom, as shown in the drawings, the extensions $c\ c$ of the rod beyond the ring being ears to aid in supporting the sieve upon the upper edge of a box E. Besides these ears others may project from the ring, as shown at $d\ d$, and be for a like purpose. The lifter at its upper end is furnished with a knob or handle $e$ and should pass freely through the bar D, which at its middle is bent in the shape of a "bell-crank," so as to be capable of extending up through the cover F of the box E when such cover is to be placed thereon, the said cover being provided with a hole $f$ made through its center and to receive the cranked part of the rod.

When coal-ashes are to be sifted, the mass is to be put into the sieve and while therein the lower portion of the sieve is to be rapidly moved upward and downward by power applied to and acting through the lifter. Such lifter may be operated—that is, moved vertically—by manual or other power. The sudden raising and depressing of the sieve at its middle will produce movements of the mass therein in radial directions, first outward from and next toward center, the same operating to produce a disturbance of the mass highly conducive to the process of sifting the finer from the coarser parts thereof.

I claim as my invention—

The flexile sifter constructed substantially in manner and so as to operate as specified.

JOHN HOLMES.

Witnesses:
R. H. EDDY,
F. P. HALE, Jr.